United States Patent [19]

Sgrignoli

[11] Patent Number: 4,653,071
[45] Date of Patent: Mar. 24, 1987

[54] CARRIER RECOVERY CIRCUIT FOR PSK COMMUNICATION SYSTEM

[75] Inventor: Gary J. Sgrignoli, Mt. Prospect, Ill.

[73] Assignee: Zenith Electronics Corporation, Glenview, Ill.

[21] Appl. No.: 608,751

[22] Filed: May 10, 1984

[51] Int. Cl.$^4$ ............................................. H04L 27/22
[52] U.S. Cl. ........................................ 375/83; 375/86; 375/56; 329/122
[58] Field of Search ..................... 375/83, 84, 85, 86, 375/80, 52, 56; 329/50, 104, 122, 124

[56] References Cited

U.S. PATENT DOCUMENTS

| | | | |
|---|---|---|---|
| 3,470,478 | 9/1969 | Crafts .................................. | 375/83 |
| 4,318,049 | 3/1982 | Mogensen ............................ | 375/86 |
| 4,338,579 | 7/1982 | Rhodes ................................ | 329/50 |
| 4,355,404 | 10/1982 | Uzunoglu ............................ | 375/86 |
| 4,409,562 | 10/1983 | Kurihara ............................. | 375/83 |

Primary Examiner—Robert L. Griffin
Assistant Examiner—Andrew J. Telesz, Jr.

[57] ABSTRACT

A PSK carrier recovery system has a frequency multiplier, a filter circuit and a limiter circuit for producing a double frequency signal from the incoming PSK signal. A pair of demodulators are supplied with the double frequency signal and with 0 and 90 degree phased reference signals of the same frequency to produce two output voltages representative of the phase of the incoming PSK signal. The output voltages are supplied through a pair of low pass filters at baseband frequency to a pair of remodulators which are also supplied with the reference signals. The outputs of the remodulators are added and applied to a filter, a limiter, a phase adjuster to compensate for processing delays and to a divide by 2 frequency circuit. The reconstituted signal has a frequency substantially equal to the incoming PSK signal and has a phase equal to one of the phases thereof. The incoming PSK signal is also supplied through a limiter to a demodulator circuit along with the reconstituted signal for demodulation.

6 Claims, 6 Drawing Figures

CARRIER RECOVERY CIRCUIT FOR PSK COMMUNICATION SYSTEM

BACKGROUND OF THE INVENTION AND PRIOR ART

This invention relates in general to phase shift keyed (PSK) communication systems and specifically to carrier recovery for demodulation of PSK signals.

In recent years, cable connected television systems have become extremely popular. In such systems a "head end" is physically linked to a large number of subscriber converters/decoders by means of individual coaxial cables to provide a wide variety of television-related programming and services. It is customary for different charges to be assessed for different types of service. In general, each cable subscriber has a uniquely identifiable decoder. The head end either includes or has access to a computer which, by appropriate data signals, controls functioning of the individual subscriber units in accordance with the type of service selected, prepares bills and performs other "housekeeping" chores.

There is growing interest in so-called "pay per view" cable systems in which a subscriber is billed for any additional or specially selected programs, rather than simply subscribing to a particular class of service on a regular basis. Thus, for example, if a subscriber wanted to watch a scrambled "pay" movie, he would communicate with the head end which would respond with an appropriate signal to enable the subscriber decoder to descramble the desired channel. The signalling can, of course, be accomplished by telephone communication, but that is cumbersome, time consuming and relatively expensive.

It has been proposed to permit subscriber-to-head end communication over the cable by transmitting data on a carrier frequency that is below the normal television signal frequency range. It has further been proposed to transmit binary data grouped in "packets", each including a number of "preamble" bits to enable "lockup" of the transmitted signal, a group of address bits to associate the data with the particular subscriber unit, a group of bits for conveying the desired information from the subscriber and a small group of bits for error detection of the received data. Since the data is transmitted in binary form, that is with 1's and 0's, phase shift keying of a carrier wave is an attractive technique because a zero degrees phase can be used to indicate a "1" and the opposite one hundred eighty degrees phase used to indicate a "0".

In phase shift keying systems, there is no readily recoverable carrier, at least for all practical purposes. There are of course techniques for sending a carrier sample, but they involve an extra signal and are subject to noise problems in the system. What is needed is a simple method of deriving a carrier that is substantially "locked" to the received signal for demodulating the received signal and determining its phase changes. In this connection, the terms lockup and locked mean to have substantially the same frequency and one of the phases of the received carrier signal.

It is known in the prior art to multiply the frequency of the received binary PSK signal by a factor of two, which eliminates the phase information, filter the output and to divide the resulting double frequency wave by a factor of two to obtain a constant phase carrier of the same frequency as the incoming signal. By synchronous demodulation, the phase changes in the incoming signal may then readily be determined.

This prior art PSK carrier recovery circuit is adequate in an ideal, that is, a noise-free, environment. In the presence of noise, however, the prior art circuit is often incapable of differentiating the signal from the noise and is therefore unreliable in recovering the carrier. Eliminating the noise requires narrow band RF filtering which may not be desirable or practical. A difficulty in using a phase locked loop (PLL) with a data packet transmission cable system is that there is a lockup time associated with the PLL, as is true for any feedback type control system. To eliminate effects of noise, the PLL requires a narrow bandwidth, which increases the lockup time. Another difficulty in using PLL circuits with a cable data packet transmission system is that the frequencies of the oscillator in each subscriber unit, through crystal controlled, may vary. To compensate for these deficiencies, a long preamble, that is string of bits at the beginning of the packet, is required to assure that the recovered carrier frequency is properly tracking the incoming carrier frequency before data detection occurs. A long preamble is not only inefficient in terms of signal transmission, but it adds to system cost and increases the time required for deciphering subscriber messages. Considering that a single cable head end may need to communicate with large numbers of subscriber units, the length of the preamble becomes quite significant indeed. Thus there is a need in the art for a PSK recovery system that is effective in noisy environments, requires only a short lockup time and which uses inexpensive filtering.

OBJECTS OF THE INVENTION

A principal object of this invention is to provide a novel PSK carrier recovery system.

Another object of this invention is to provide an improved PSK communication system.

A further object of this invention is to provide a PSK carrier recovery system that is operable in noisy environments.

SUMMARY OF THE INVENTION

The inventive method and apparatus are provided in a PSK signalling system of the type wherein there is provided a received phase modulated signal, means for producing a multiple frequency signal related to the phase modulated signal and means for dividing the multiple frequency signal to produce a constant phase signal for demodulating the phase modulated signal. The invention includes means for generating a pair of reference signals of substantially the same frequency as the multiple frequency signal and bearing a fixed phase relationship to each other, means for demodulating the multiple frequency signal with each reference signal for producing phase representative signals and means for using the phase representative signals for remodulating the reference signals to produce a reconstituted multiple frequency signal.

DESCRIPTION OF THE DRAWINGS

These and other objects of the invention will be apparent upon reading the following description thereof in conjunction with the drawings in which.

DESCRIPTION OF THE PREFERRED EMBODIMENT

Figure 1:
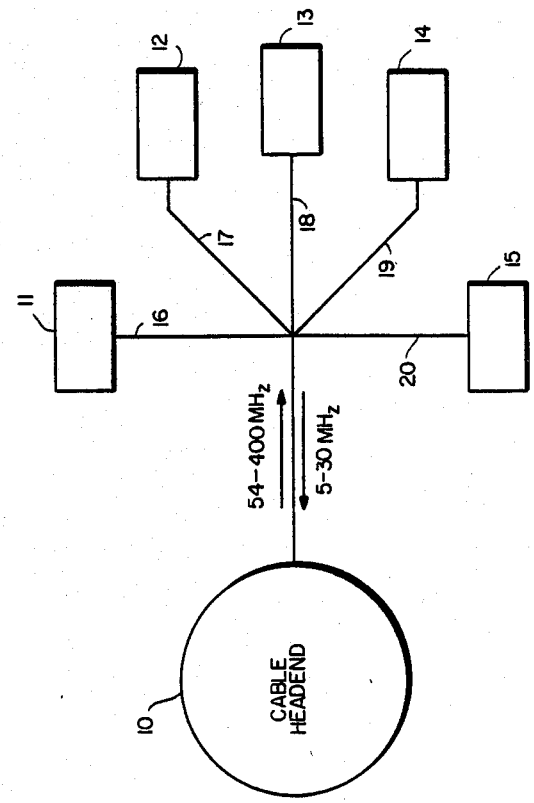
FIG. 1 represents a block diagram of a cable system head end and a number of subscriber decoder units.

Referring to FIG. 1, there is shown a highly simplified arrangement of a cable head end and subscriber units constructed in accordance with the invention in which a head end 10 is coupled to a plurality of subscriber decoders 11–15 via a plurality of coaxial cables 16–20, respectively. It will be appreciated that the head end includes, or has access to, computer apparatus and means for transmitting television program information to the subscriber decoders and to send (and receive) predetermined messages to each subscriber unit. As indicated on the drawings, television information is transmitted in a frequency range of 54 through 400 MHz from the head end to the subscriber decoders. It will be appreciated that the 400 MHz frequency limit is merely representative of current technology and practice and should not in any way be considered a limitation on use of the invention. Subscriber decoder functions may, for example, be controlled from the head end by appropriate data transmission in the vertical interval of a television signal, in accordance with common practice. Such decoder functions could also be controlled by means of separate communication links (either on or off the cable), not tied to the television transmission. Transmissions from the subscriber decoders to the head end may be by a carrier having a frequency well below 54 MHz, such as a 5.5 or an 11.0 MHz carrier, for example. Each subscriber decoder is identified by a unique binary address, recognizable by the head end, and each decoder includes an oscillator for generating the carrier for transmitting data back to the head end. The head end includes a master oscillator tuned to the same carrier frequency and a receiving circuit for receiving the transmitted signals from the subscriber decoders. While the oscillators in the head end and subscriber decoders are under the control of crystals, there will be inevitable differences in their frequencies and a carrier recovery system based upon use of the oscillators must be capable of reliable operation with these frequency differences.

Figure 2:
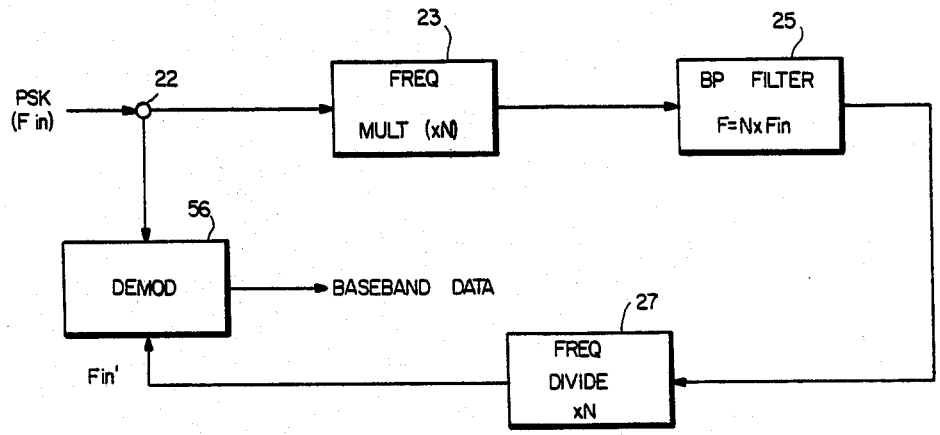
FIG. 2 is a prior art PSK carrier recovery system.

FIG. 2 represents a prior art PSK carrier recovery system. The PSK input signal of frequency Fin is applied to an input terminal 22 where it is supplied to a frequency multiplier 23 and to a demodulator 56. The frequency multiplier produces a sine wave signal of N times the frequency of Fin, where N is an integer corresponding to the number of different, equally spaced, carrier phases, that is supplied to a bandpass filter 25 for passing the N times Fin signal, which is now of constant phase. Bandpass filter 25 determines the noise bandwidth of the carrier recovery system. The output of filter 25 is passed through a frequency divider 27 having a divide ratio of N and the resultant F'in output is supplied as the other input of the demodulator. F'in is thus a constant phase signal equal in frequency to Fin and having a phase equal to one of the phases of Fin.

Figure 3:
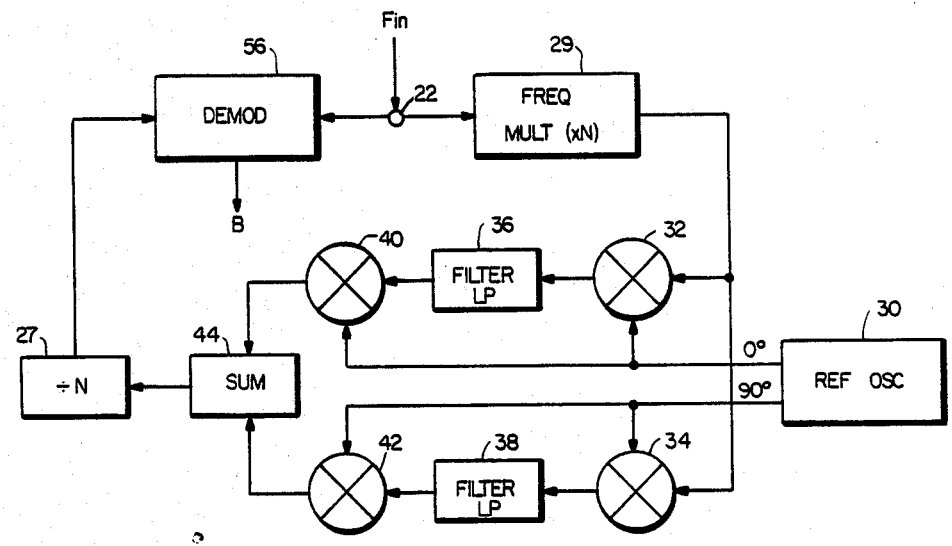
FIG. 3 is a block diagram of PSK carrier recovery apparatus constructed in accordance with the broad aspects of the invention.

In FIG. 3, an incoming PSK modulated signal is supplied to input terminal 22 that is connected to two different paths as in the prior art circuit. One path supplies a frequency multiplier 29 which, like the prior art, includes means for multiplying the incoming phase modulated signal by a factor N, where N is equal to an integer. In a binary system, where one phase of the PSK carrier represents a binary "1" and the opposite phase represents a binary "0", N will be equal to two. Since FIG. 3 represents the general application of the invention, frequency multiplier 29 may comprise a sine wave multiplier for producing a signal of N times the frequency of the incoming signals. N of course is selected to be an integer so that the phase information is removed. In a four phase system, N would be 4 and the individual phases of the carrier could present the binary combinations of 0-0, 0-1, 1-0 and 1-1.

The output of frequency multiplier 29 is supplied to a pair of multipliers 32 and 34. A reference oscillator 30, which may comprise the oscillator in the head end, produces an output frequency of N times that of the incoming PSK signal and generates two separate reference signals, one at 0 degrees and one at 90 degrees relative phase to each other. These two reference signals are supplied to multipliers 32 and 34, respectively, along with the output of frequency multiplier 29 for demodulating the signals from multiplier 29 and generating two phase representative output signals which together are representative of the phase of the signal from multiplier 29 with respect to the reference oscillator.

These phase representative signals are passed through a pair of low pass filters 36 and 38 for removing any high frequency components produced in the demodulation process and determining the noise bandwidth and lockup range. It should be noted that filtering is done at baseband frequencies and is thus much simpler than the RF filtering of a filter such as filter 25 in FIG. 2. The filtered outputs respectively are then supplied as further inputs to a pair of "remodulators" 40 and 42, the other inputs of which are supplied with the reference signals from oscillator 30. The effect of the demodulation/remodulation process is to reconstitute a signal corresponding to the output of frequency multiplier 29 in a summing arrangement 44 to produce a cleaner, that is, less noisy, signal of constant frequency and phase corresponding to N times the frequency of the incoming PSK signal.

The output of sum circuit 44 is supplied to a divide-by-N circuit 27 for developing a reconstituted signal of the same frequency as, and having a constant phase equal to one of the phases of, the incoming PSK signal.

Figure 4:
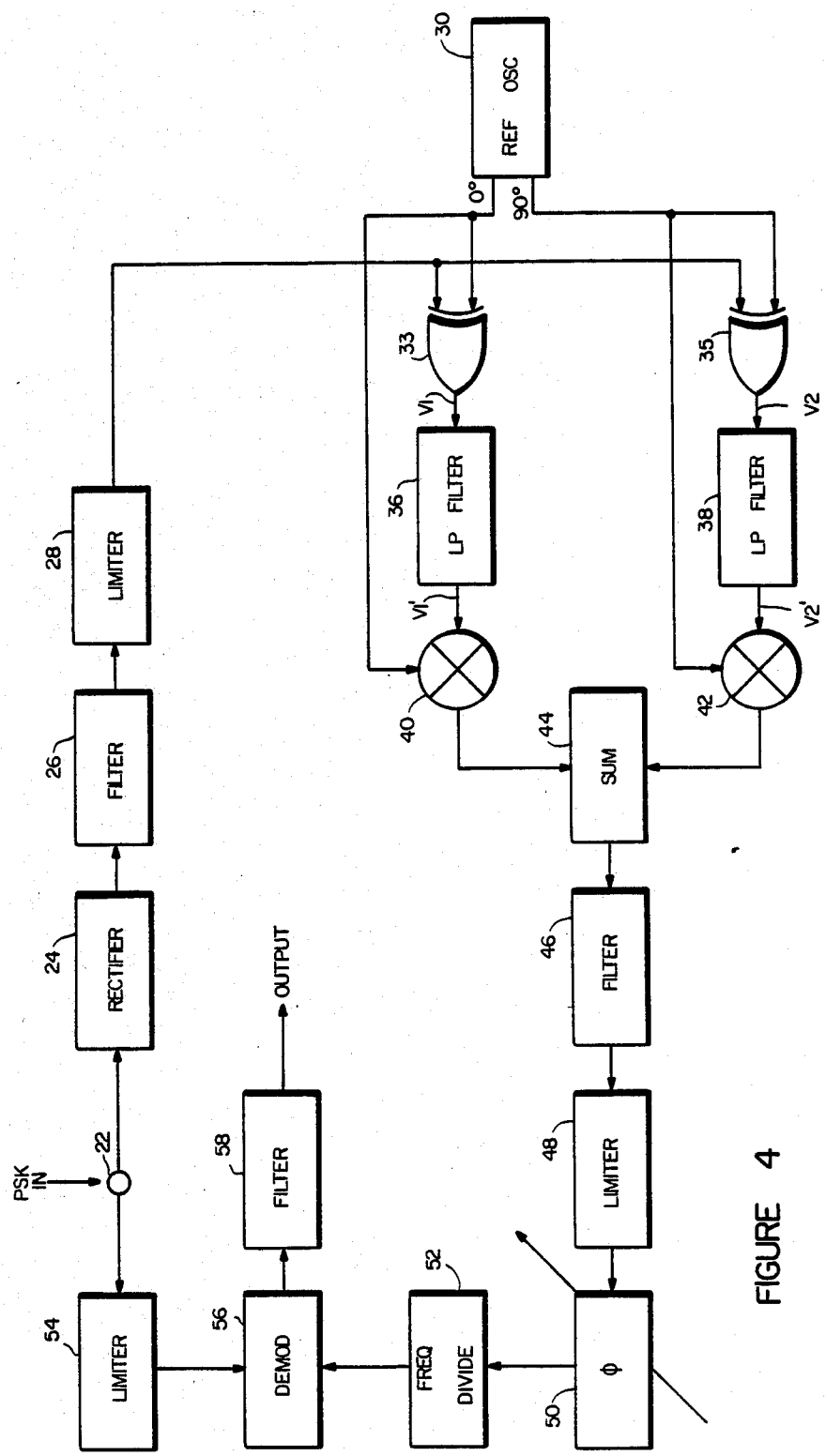
FIG. 4 is a diagram of a more specific implementation of the inventive system.

In FIG. 4, an attractive implementaton of the invention especially adapted to a binary, i.e., N=2, system is disclosed. Frequency multiplication is provided by a rectifier 24, a filter 26 and a limiter 28 for developing a double frequency signal related to the incoming PSK signal, but of constant phase. Filter 26 passes the second harmonic of the PSK signal, thus removing the higher frequency products of the rectification process while the limiter generates a square wave signal from the filter output. The output of limiter 28 is supplied as inputs to a pair of exclusive OR gates 33 and 35, the other inputs of which are supplied with the 0 and 90 degree phase displaced square wave reference signals from oscillator 30. The exclusive OR gates are thus seen to replace the demodulators 32 and 34 of FIG. 3. The outputs of the exclusive OR gates are a pair of phase-representative signal voltages V1 and V2 which, in turn, are supplied through low pass filters 36 and 38 to remove the high frequency components produced in the demodulation process as well as to determine the noise bandwidth and lockup range. This filtering is done at baseband frequencies. The filtered output voltages V1' and V2' are supplied to remodulators 40 and 42 along with the reference signals from reference oscillator 30 to develop a reconstituted signal of twice the frequency of the PSK signal input, in the output of sum circuit 44.

This signal is supplied to another filter 46 for removing the products of the remodulation process that are outside the area of interest. The filtered signal is then supplied to a limiter circuit 48 for generating a clean, square wave of the frequency of the incoming PSK signal. The output of limiter 48 is supplied to a phase adjustment circuit 50 which is adjusted to compensate for the additional phase delay experienced by the incoming signal in traversing the path just described from input terminal 22. The output of phase adjustment circuit 50 is supplied to a frequency divider 52 which includes means for dividing the frequency by N. In this embodiment, where N is equal to two, frequency divider circuit 52 may comprise a simple flip flop arrangement. Thus, the output of divider 52 comprises a reconstituted signal having the frequency of the incoming PSK signal and having a phase equal to one of the PSK carrier phases. This reconstituted signal is supplied as one input of a demodulator 56.

The incoming PSK signal at terminal 22 is also supplied to another, much shorter path to a limiter 54, the output of which is supplied as the other input to demodulator 56. Thus, demodulator 56 sees two square waves of substantially identical frequency. One is the incoming PSK signal that experiences changes in phase and the other is the reconstituted signal from divider 52 that has a constant phase. The output of the demodulator is supplied to a filter 58 for removing the sum frequencies generated in the demodulator and determining the baseband pulse shaping factor. The final output is a positive voltage for one phase of the PSK input and a negative voltage for the other phase. This demodulator output is at baseband frequencies and is sent to a data slicer (not shown). It should be noted that demodulator 56 may also take the form of an exclusive OR gate followed by a low pass filter.

Figure 5:
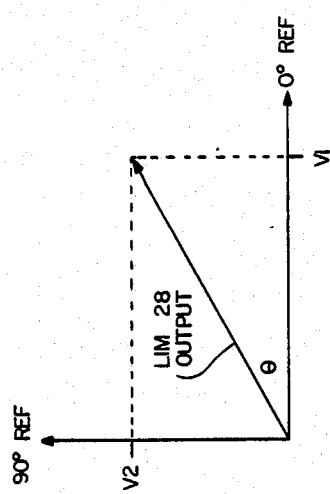
FIGS. 5 and 6 are diagrams illustrating one aspect of the invention.
Figure 6:
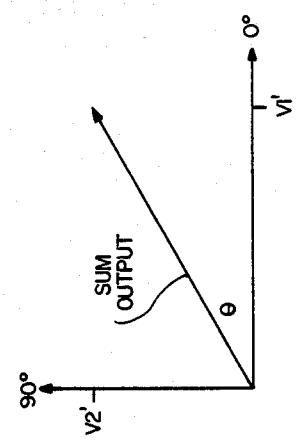

In FIGS. 5 and 6, the processes of demodulation and remodulation for the arrangement of FIG. 4 are vectorially shown. During demodulation, the signal from limiter 28 is used to develop voltages V1 and V2 representing the relative phasing thereof with the 0 and 90 degree phases of the reference signal. When these phase representative voltage signals are filtered and applied as V1' an V2' to the remodulators (along with the 0 and 90 degree reference signals) the combined output at the sum circuit 44 has the same phase as the signal output of limiter 28. The difference is that the signal is now greatly noise reduced because of the low pass filtering. It can be shown that the remodulated signal tracks the frequency of the input signal to the demodulators.

It will be apreciated by those skilled in the art that for demodulation of the incoming PSK signal in demodulator 56, the reference oscillator must be close to the frequency of the incoming PSK signal. However, with the invention, the frequencies of the various PSK transmitters need not be closely controlled, depending upon the time available for locking and the amount of noise to which the receiver is to be subjected. As mentioned above, the signal output of limiter 28 is derived directly from the PSK signal input and is therefore locked in frequency thereto. Differences between this signal output frequency and that of reference oscillator 30 will give rise to alternating current components in V1 and V2 of frequencies that are a function of the difference. The characteristics of filters 36 and 38 will determine the maximum frequency difference that can be tracked to correctly provide a reconstituted signal for use in the demodulating circuit. With the circuit of the invention it has been found that a preamble of only sixteen bits is required for reliable operation, in noisy environments and with frequency deviations of as much as plus or minus 1.5 percent. Thus, it may be seen, that the circuit of the invention provides for dramatically improved carrier recovery in a PSK system.

It will be recognized that the FIG. 4 embodiment, with the limiters, introduces some phase error, whereas the sine wave implementation does not. However, the errors are not of significance in the operation of the circuit and the limiter version is preferable for other design reasons. Errors may also be introduced by dissimilarities in the multipliers (demodulators), filters, remodulators and by the stability of the phase adjustment.

Since the demodulator/remodulator combination will track changes in frequency between the PSK signal input and the reference oscillator, both frequency and phase recovery of the carrier is obtained.

It is recognized that numerous modifications and changes in the described embodiment of the invention will be apparent to those skilled in the art without departing from the true spirit and scope thereof. The invention is to be limited only as defined in the claims.

What is claimed is:

1. A PSK signaling system comprising:
   means for receiving a first signal;
   multiplication means coupled to said means for receiving for producing a second signal of twice the frequency of said first signal;
   means for generating a pair of reference signals having a frequency similar to said second signal and displaced in phase by 90 degrees from each other;
   means for demodulating said second signal with each of said reference signals to generate phase representative signals;
   a pair of remodulators for modulating said reference signals with said phase representative signals;
   filter means coupled between said demodulating means in said remodulators;
   means for generating a reconstituted signal equal in frequency and phase to that of said second signal by combining the outputs of said remodulators;
   division means for dividing said reconstituted signal to produce a constant frequency and phase third signal of a frequency equal to said first signal; and
   a demodulator circuit for demodulating said first signal with said third signal.

2. The signalling system of claim 1 wherein said means for producing a second signal comprises a full wave rectifier; and further including a filter and a limiter coupled thereto for deriving a double frequency square wave signal from said received signal;
   means for passing said reconstituted signal through a flip flop frequency divider; and
   means for generating a square wave corresponding in frequency and phase to said first signal and for supplying said demodulator circuit with said square wave and with the output of said frequency divider.

3. The signalling system of claim 2 wherein said demodulating means comprise exclusive OR gates.

4. A PSK signalling system comprising:
- means for rectifying, filtering and limiting an incoming PSK signal to produce a double frequency square wave constant phase signal;
- an oscillator producing two 90 degrees phase displaced reference signals of substantially twice the frequency of said incoming PSK signal;
- a pair of demodulators for synchronously demodulating said constant phase signal with said reference signals to generate a pair of phase representative signals;
- means for filtering said phase representative signals;
- a pair of remodulators for modulating said reference signals with said phase representative signals, respectively;
- summing means for adding the outputs of said remodulators to produce a double frequency remodulated signal having a phase equal to one of the phases of said incoming PSK signal;
- means for filtering said remodulated signal to develop a square wave signal therefrom;
- means for dividing said developed square wave signal by two to produce a reconstituted signal substantially equal to the frequency of said incoming PSK signal and being in phase with one of the phases thereof;
- means for generating a square wave signal from said incoming PSK signal; and
- means for demodulating said generated square wave signal with said reconstituted signal.

5. The signalling system of claim 4 further including:
- phase adjustment means for compensating for transit time delay in said system.

6. The signalling system of claim 5 wherein said pair of demodulators comprise exclusive OR gates.

* * * * *